G. B. EVANS & T. E. CHERRY.
NAILING MACHINE.
APPLICATION FILED OCT. 26, 1907.
928,645.
Patented July 20, 1909.
5 SHEETS—SHEET 1.
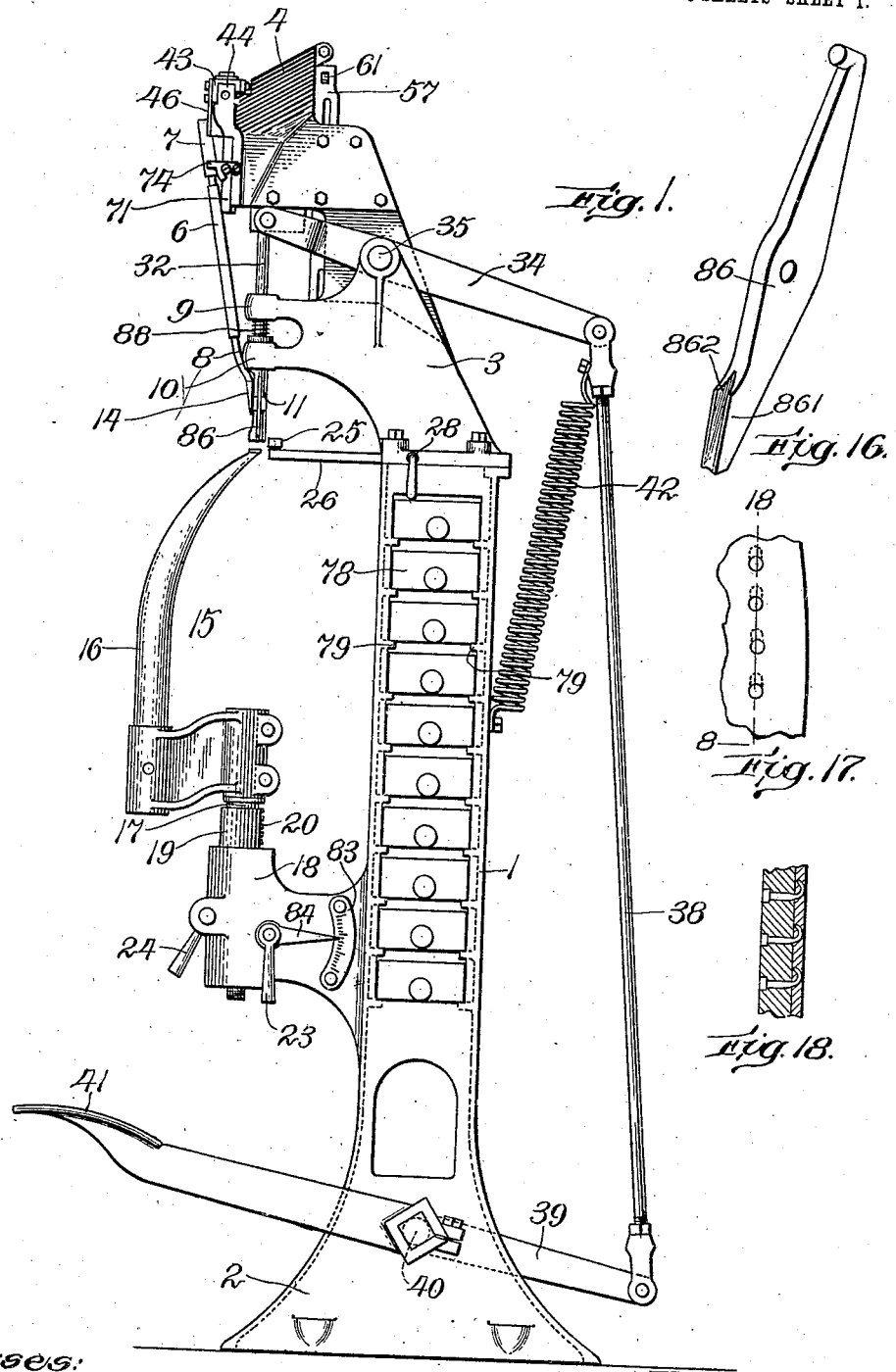

G. B. EVANS & T. E. CHERRY.
NAILING MACHINE.
APPLICATION FILED OCT. 26, 1907.
928,645.
Patented July 20, 1909.
5 SHEETS—SHEET 2.
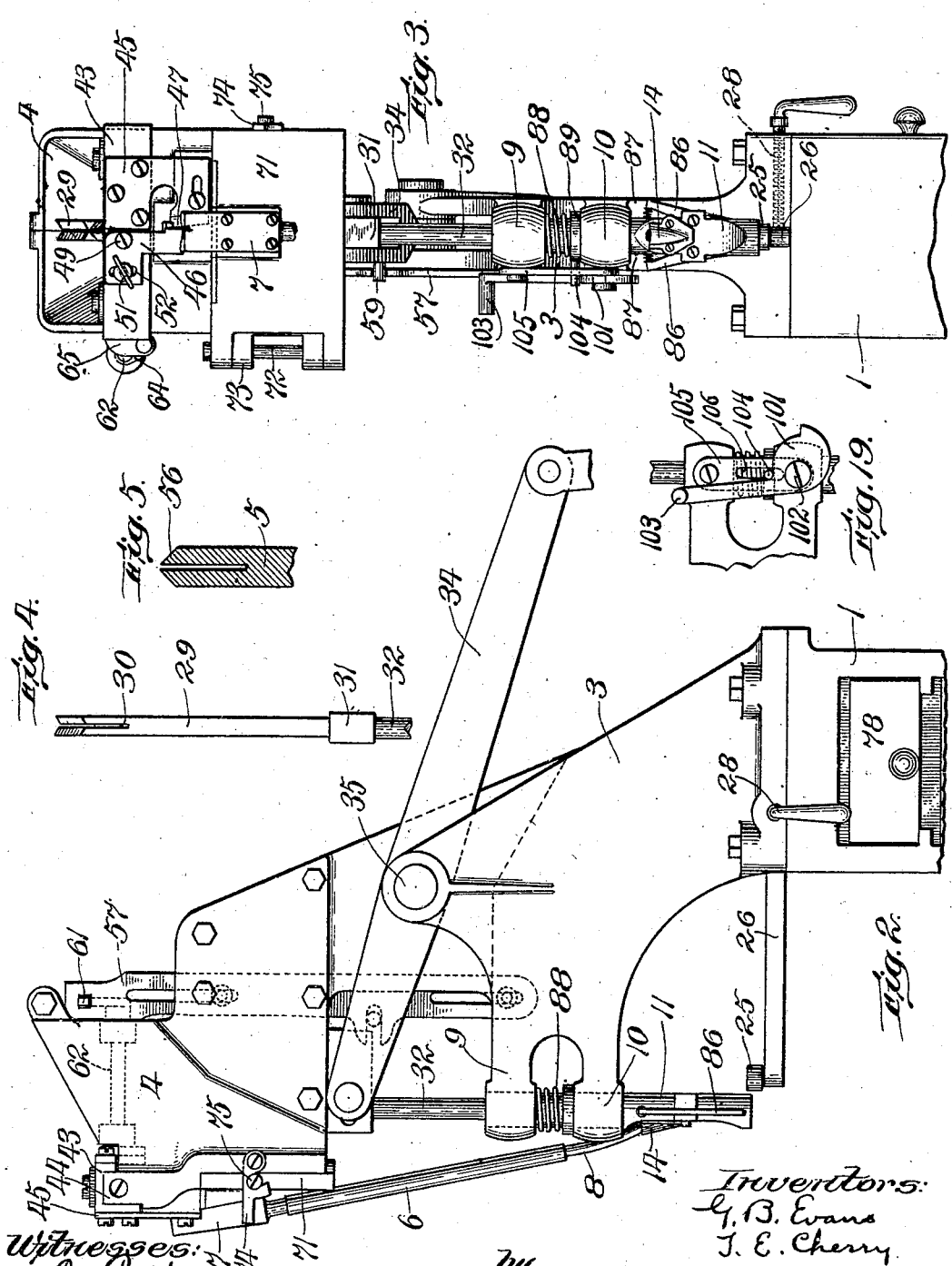
Witnesses:
A. C. Ratigan
B. D. Glover
Inventors:
G. B. Evans
T. E. Cherry
by
Attys.

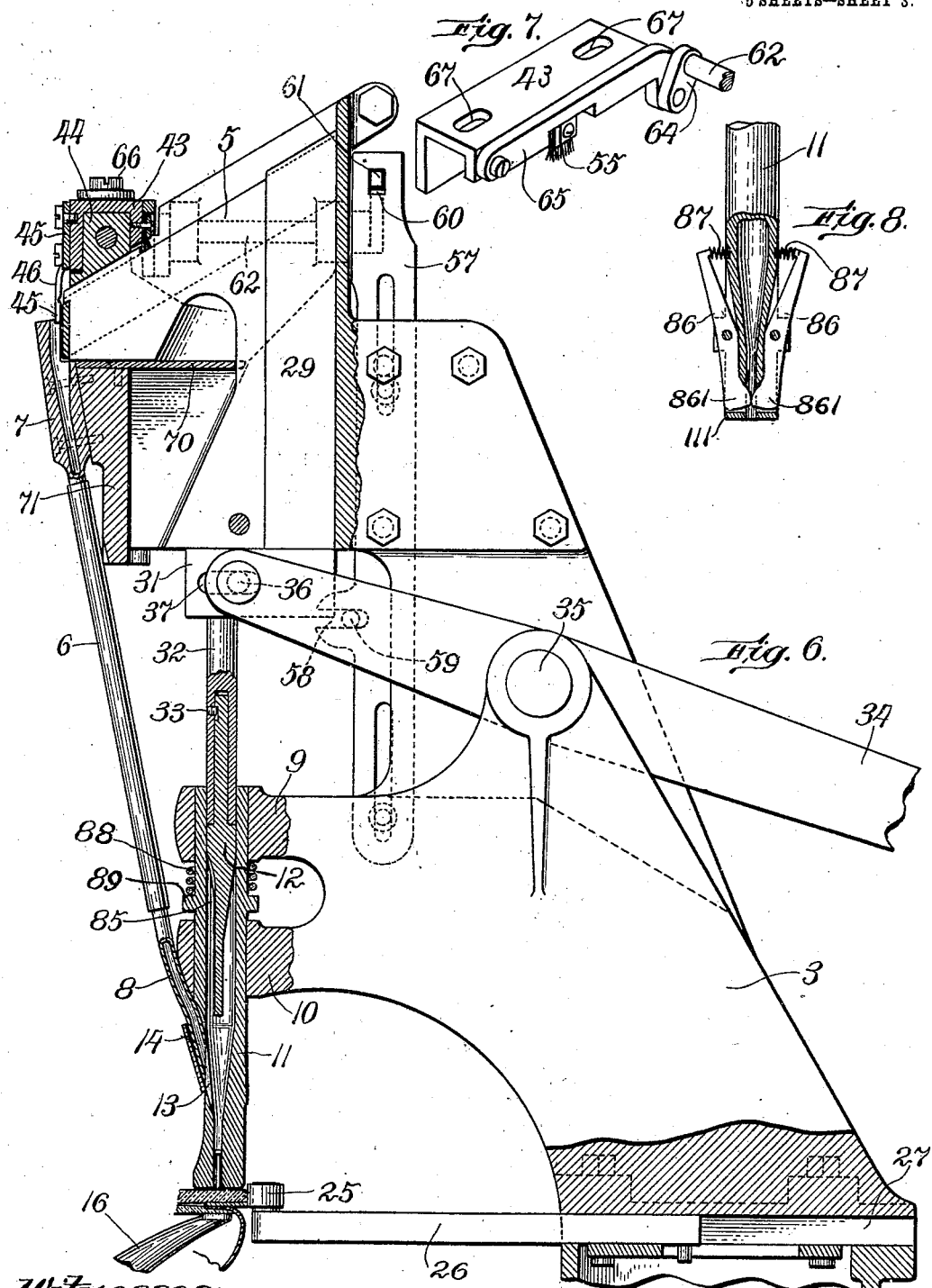

G. B. EVANS & T. E. CHERRY.
NAILING MACHINE.
APPLICATION FILED OCT. 26, 1907.
928,645.
Patented July 20, 1909.
5 SHEETS—SHEET 4.
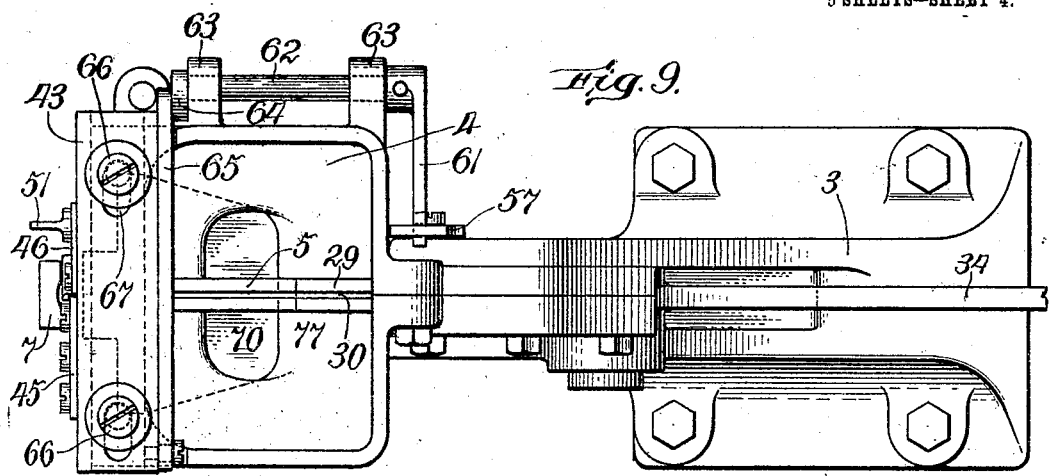
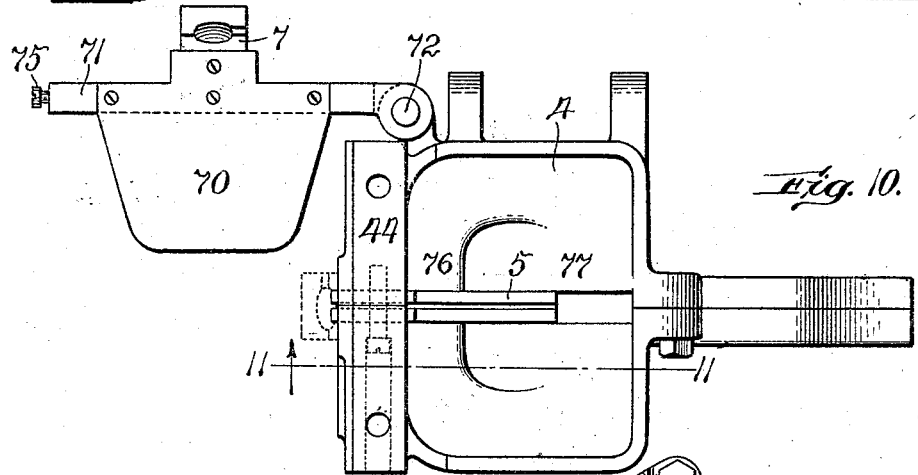
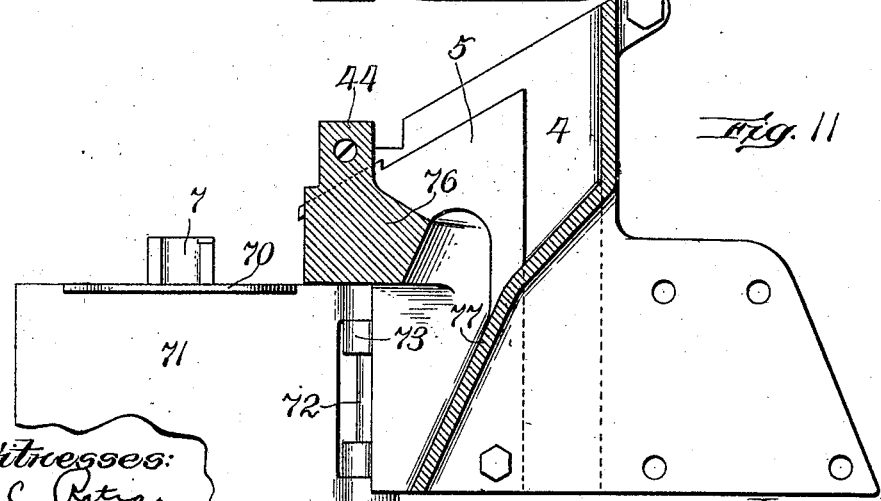

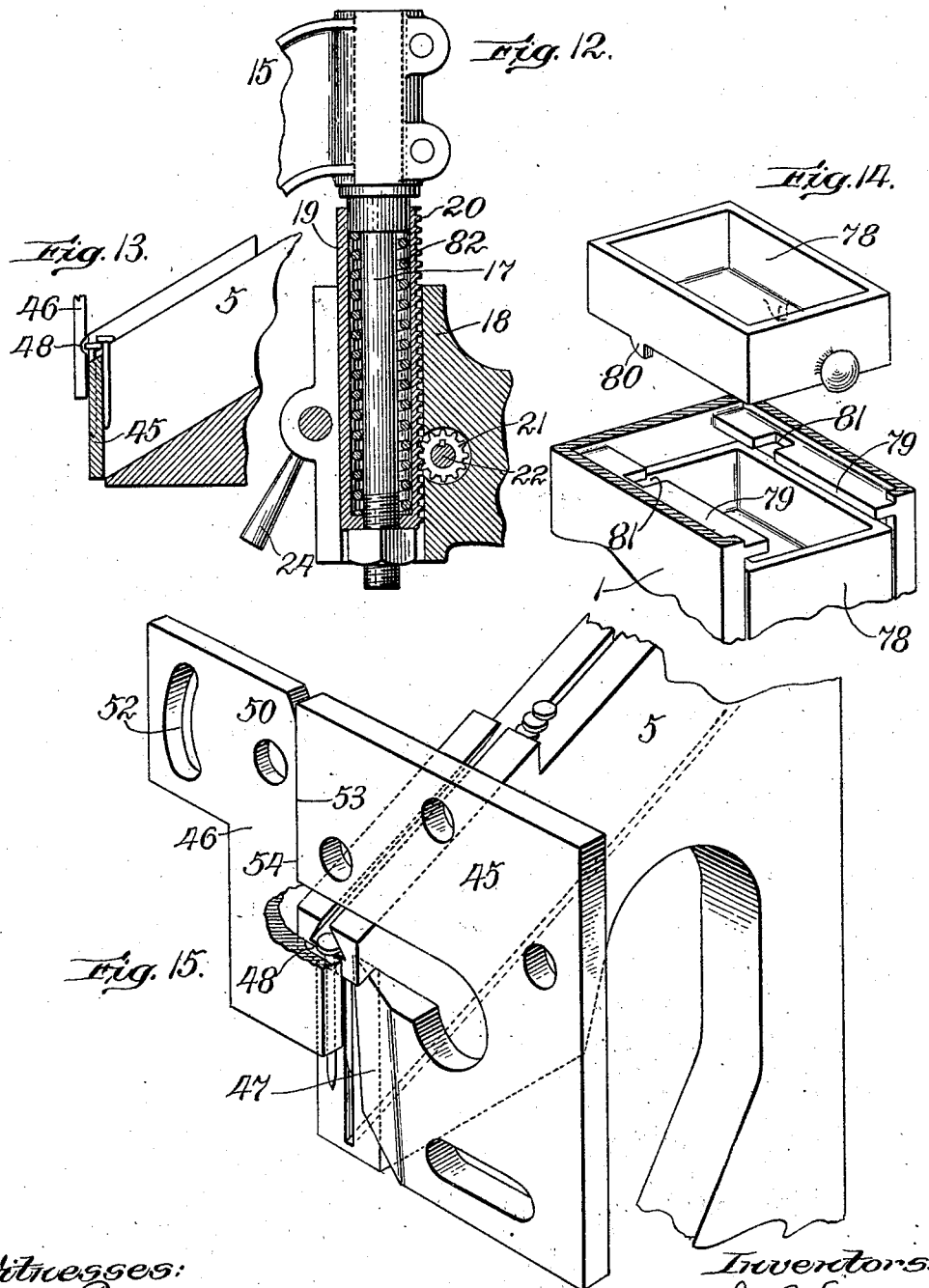

UNITED STATES PATENT OFFICE.

GEORGE B. EVANS, OF WINTHROP, AND THOMAS E. CHERRY, OF REVERE, MASSACHUSETTS, ASSIGNORS TO CHARLES F. BAKER, OF BOSTON, MASSACHUSETTS.

NAILING-MACHINE.

No. 928,645.　　　　　Specification of Letters Patent.　　　　Patented July 20, 1909.

Application filed October 26, 1907. Serial No. 399,335.

To all whom it may concern:

Be it known that we, GEORGE B. EVANS and THOMAS E. CHERRY, of Winthrop and Revere, respectively, both in the county of Suffolk and State of Massachusetts, have invented certain new and useful Improvements in Nailing-Machines, of which the following is a specification.

This invention is intended to provide a simple foot-power nailing machine for the use of cobblers in repairing shoes.

The primary object is to increase the speed and accuracy with which the nails may be set in a shoe.

Secondary objects contributing to secure speed, accuracy and durability of work are to provide means for supporting a shoe firmly and in correct position, to guide the nails perpendicularly to the exact point required, and to enable nails of any desired length to be substituted for those already in the magazine without delay.

A machine embodying the construction and mode of operation by which the objects above outlined are carried into effect is illustrated in the accompanying drawings, in which,—

Figure 1 represents a side elevation of the machine. Fig. 2 represents a similar view on an enlarged scale, of the head of the machine and the parts associated therewith. Fig. 3 represents a front elevation of the parts shown in Fig. 2. Fig. 4 represents a front elevation of the nail lifter used to arrange the nails in order and deliver them to the raceway. Fig. 5 represents a fragmentary sectional view of the nail raceway. Fig. 6 represents a sectional elevation on a still larger scale, of the machine head, nail-driving mechanism, and the nail-feeding devices. Fig. 7 represents a perspective view of the slide carrying the nail feeder, raceway clearer and part of the mechanism for operating the same. Fig. 8 represents a sectional elevation of the nail throat and the nail arresters therein. Fig. 9 represents a plan view of the machine. Fig. 10 represents a similar view showing the front plate and removable hopper bottom in the open position. Fig. 11 represents a sectional elevation on line 11—11 of Fig. 10. Fig. 12 represents a sectional elevation of the work-support and means for adjusting it. Fig. 13 represents a sectional elevation of the raceway and nail feeder. Fig. 14 represents a perspective view of part of the column of the machine and the nail-holding drawers contained therein. Fig. 15 represents a perspective view of the raceway end and nail feeder. Fig. 16 represents a perspective view of one of the nail detents. Fig. 17 represents a fragment of a shoe sole, showing the manner in which the nails are driven. Fig. 18 represents a section on line 18—18 of Fig. 17. Fig. 19 represents a detail of construction.

The same reference characters indicate the same parts in all the figures.

The machine consists of a supporting column or frame 1 having a widened base 2 and carrying at its top the head 3. At the extreme upper end of the head or bracket 3 is a nail hopper 4 in which is located an inclined raceway 5. This raceway passes through the wall of the hopper and discharges into a chute 6, of which the upper end is formed from a rigidly mounted cored metal block 7, and the lower part is a metal tube 8 connected with the block by a section of flexible tubing, the latter being either coiled wire or rubber.

Below the hopper arms 9 and 10 project from the head and are bored out to receive a tube 11 which serves as a guide for a driver 12 and as a throat to guide the nails to the point where they are to be driven. The nail throat has an opening 13 at one side near its lower end to serve as an inlet for the nails. A convex plate 14 is fastened over this opening and serves as a pocket to receive the lower end 8 of the nail chute.

Below the nail throat is a work-support 15 consisting of a horn 16 rotatably mounted upon a bar 17 contained in a socket formed in a bracket 18 which projects from the machine column. The horn is curved so that its end may extend into the toe of a shoe, and this end is arranged directly below and in close proximity to the nail throat. The bar 17 is contained in a sleeve 19 which is provided with rack-teeth 20. A pinion 21 is contained in bearings in the bracket 18 and meshes with the teeth 20. It is supported by a shaft 22 upon which is mounted a handle 23 whereby it may be turned. As will be readily seen, a turn of the handle 23 will raise or lower the horn until the sole or heel of a shoe to be nailed is close to the end of the nail throat. The horn is secured in adjusted position by a clamp 24 which draws the sides of the socket in closed engagement with the sleeve 19, the socket being split for this purpose. The nails are located at a uniform distance from the edge of the sole or heel by a gage wheel 25 mounted upon an arm 26 which passes into a guideway 27 in the base of the head 3. A clamp 28 secures the gage at any desired position.

The nails, which are thrown in a disordered mass into the hopper, are lifted and placed in order in the raceway by a nail lifter 29 which reciprocates vertically in the hopper directly in rear of and close to the raceway. This lifter has in its upper end a slot 30, the sides of which diverge at the top. When the lifter is lowered a few of the nails will slip into the slot, point first, and will then be raised by their heads when the lifter is moved upward. As the upper end of the lifter is inclined on the same slant as the raceway and rises into line with the top thereof, the nails which are so positioned and lifted will slide off into the raceway and arrange themselves in order therein with their points downward. The lower end of the lifter which passes through the bottom of the hopper is formed with an offset foot 31 which projects laterally far enough to cross the axis of the nail tube 11. From the lower side of this foot or block 31 projects a bar 32 having a central bore which receives the shank of the driver 12. A set-screw 33 holds the driver in the said bore. Thus the driver and lifter are united together and form in effect one piece of which all the parts move alike.

The machine is operated by a lever 34 pivoted at 35 and carrying at one end a pin 36 projecting into a slot 37 in the block 31. To the other end of the lever is pivoted a link 38 connected by a treadle lever 39 pivoted at 40 in the base of the column 1 and having a tread piece 41 on which the foot of the operator bears. By reason of these connections, downward pressure on the treadle causes the driver to be forced down so as to drive a nail and lower the lifter. A spring 42 serves to return the parts to normal position and elevates the lifter and driver with the results before described.

The raceway 5 projects through the front of the hopper and terminates at the upper part of the passage in the block 7. There is a nail arrester and feeder which reciprocates across the end of the raceway and picks off the nails one by one, allowing them to drop into the chute. This nail feeder is mounted upon a slide 43 which embraces a fixed guideway 44 extending transversely across the front of the hopper, and consists of two plates 45 and 46 secured to the outer flange of the slide. The plate 45 has a portion or blade 47 with a beveled edge, which reciprocates close to the end of the raceway and enters between the nails so as to pick off the outer one. The other plate 46 hangs downward and slightly overlaps the edge of the blade 47. It is notched at 48 to receive the heads of the nails and set out sufficiently so as to leave a passage for the nail shanks between itself and the blade 47. Plate 45 is secured to the slide 43 so as to be rigid under all circumstances, but the plate 46 is mounted with provision for being swung aside to allow the nails to escape. The securing means consists of a screw 49 passing through a hole 50 and a thumb-screw 51 passing through a slot 52 which is concentric with the hole 50. The edges 53 and 54 of the plates normally abut and maintain the lower end of the plate 46 in the proper position to cover the raceway passage when the blade 47 is at one side thereof, while keeping the diagonal nail passage of the proper width. On the inner flange of the slide 43 is secured a brush 55 which passes back and forth across the raceway with the travel of the slide and clears the raceway of any nails which may have been improperly lodged. That portion of the raceway in rear of the slide 43 is beveled, as shown at 56 in Fig. 5, to facilitate the dislodgment of improperly positioned nails, while that portion which passes through the guide 44 has flanges partially inclosing the heads of the nails so as to prevent their riding over each other.

The slide, feeder and raceway clearer are reciprocated by the lever 34 through a vertically sliding bar 57 having a slot 58 into which projects a pin 59 carried by the lever and having also a perforation 60 to receive an arm 61 on a rock-shaft 62 contained in lugs 63 which project from the side of the hopper. A second arm 64 on the rock-shaft is pivotally connected with the slide through a link 65. The slide is retained in place by screws 66 passing through elongated slots 67 and into the guide.

In doing cobbling work, nails of many different lengths must be used. Consequently it is of great importance that provision should be made for quickly removing nails of one character from the hopper so that larger or shorter nails may be substituted without liability of mixing those of different kinds. Accordingly, the hopper body is formed with an opening in its lower portion across which normally extends a movable bottom plate 70. The hopper is formed from castings bolted together so as to provide completely encircling walls at the upper portion, but leaving the lower portion open, as is most clearly shown in Fig. 11. To the front of the hopper is hinged a front plate or door 71 which swings about a pintle 72 in lugs 73 formed upon one of the castings. This plate is capable of swinging outward, as shown in Figs. 10 and 11, or directly across the hopper, and of being secured by a latch 74 hooking over a stud 75, as shown in Fig. 2. The plate 70 is secured to the top of the door 71 and projects horizontally therefrom so as to extend entirely across the space between the inclosing walls of the hopper when the door is in closed position, as shown in Figs. 6 and 9, passing closely beneath the front wall 76 of the upper part of the hopper so that when it is withdrawn, the nails resting upon it will be swept off by this front wall. The rear wall 77 of the hopper is inclined so as to guide the nails outward as they fall upon removal of the bottom plate, and allow them to be caught by a receptacle held beneath for that purpose, and saved for future use. The front wall 76 is given such a slope that there is no danger of nails lodging upon it when the bottom plate is withdrawn.

In order that the nail chute 6 may not offer any impediment to the swinging plate 71, the upper end of this chute is rigidly secured to the plate, and swings aside with it. This causes withdrawal of the lower end of the chute from the nail throat, and it is for this purpose that the detachable connection previously described has been provided. After the plates 71 and 70 have been displaced, and the hopper allowed to empty itself, the raceway end is uncovered by swinging aside the plate 46, whereupon the nails lodged in the raceway are free to slide out. Thus in an extremely brief time, every nail in the hopper and raceway may be removed ready for the substitution of other nails.

The nails are stored accessibly in drawers 78 in the column of the machine. This column is formed of cast metal having one side open for a part of its length, and formed with interior shelves or flanges 79 on the sides adjacent to the opening and projecting toward each other. The drawers rest on these shelves, and have on their bottoms lugs 80 which engage in notches 81 formed in the shelves. These lugs and notches interlock and prevent the shelves from being thrown outward by the jarring of the machine.

In operating the machine, the shoe to be nailed is placed over the horn and the latter is elevated by the handle 23 until the shoe presses with some firmness against the bottom of the throat. The fact that the horn is supported by a spring 82 in the sleeve 19, causes a yielding pressure to be produced. Nails of the required length are taken from the appropriate drawer 78, and thrown into the hopper. The length of the nail required is determined very simply by a scale 83 adjacent to a pointer 84 secured to the shaft of the horn-elevating pinion. Graduations are provided on the scale which read in terms of linear measurement, and are so adjusted in relation to the pointer as to tell the exact length of nail necessary to be used with any adjustment. This length is equal to the distance between the horn and nail throat plus an amount necessary for clenching the nail.

After the work support and gage 25 have been adjusted, the treadle is depressed and then released so as first to cause one or more nails to be placed in the raceway, and then to drive the nails. After having depressed the treadle, the operator removes his foot quickly so that the spring 42 may return the parts with a rapid motion and cause the foot 31 of the lifter to strike the hopper with a sharp blow. This foot serves as a hammer, and when striking the hopper, jars the same so as to prevent the nails sticking in the raceway and cause them to slip down until arrested by the feeder or by the preceding nails.

When a nail has been fed from the raceway, it falls into the chute, and thence into the nail throat, the driver being partly cut away at 85 in order that it may oppose no obstruction to the passage of the nail. At the bottom of the throat the nail is arrested and prevented from falling out by stop levers 86 pivoted to the sides of the nail throat and projecting at their lower ends into the same. They are held in this position, illustrated in Fig. 8, by springs 87. These springs cause the detents to oppose some resistance to the passage of the driver so that the latter will cause depression of the nail throat into firm contact with the sole of the shoe before the nail is driven. A spring 88 normally holds the nail throat down so that a shoulder 89 thereon is in contact with the arm 10. However, the spring will yield and allow the throat to rise when a shoe to be cobbled is pressed up against it. The throat is then held with a uniform pressure against the sole of the shoe, yielding when parts of uneven thickness pass between it and the horn, but always maintaining the throat in contact with the sole so that liability of the nails being incorrectly placed or driven on a slant is effectively avoided. It will be noted that the end of the throat is so shaped and proportioned as to provide a flat bearing surface of considerable area entirely surrounding the nail passage. This extended area renders impossible any indenting of the sole by the throat under pressure of the spring, and at the same time, serves as a gage for properly spacing the nails. That is, after a nail is driven, the shoe is moved along until the last-driven nail appears beyond the edge 111 of the throat. The shoe is then arrested and the next nail driven.

To permit removal and placing of a shoe without shifting the horn, I provide a device for lifting the throat in opposition to the thrust of the spring 88. This means is a cam 101 pivoted at 102 upon the arm 10 and having a handle 103 by which it may be turned. A pin 104 projecting from the throat bears against the periphery of the cam and is elevated when the handle 103 is lowered. A link 105 extends between the arms 9 and 10, and has a slot 106 through which the pin 104 passes. As this link is immovable, the slot serves as a guide for preventing the throat from rotating and displacing the pin.

The nails used with this machine are preferably somewhat flattened near the points, the width of the flattened portion being equal to the full diameter of the nail shank, but the thickness being of less than this amount. Accordingly, when the nail is driven against the horn, its flattened point will be bent over in the direction of its least dimension. In cobbling a shoe it is desirable to use as few nails as possible, for the sake of economy, both of time in driving the nails and of material. For this purpose I cause each nail to be so arranged that the greater cross-sectional dimension of its flattened end portion is radial to the edge of the sole, the points being bent over and clenched along the line in which the nails are arranged, thus causing each nail to penetrate the work at two points and perform the work of two. The placing of the nails in position to secure this end is effected by the detents 86 previously referred to. The lower ends 861 of these detents project into the nail passage in the throat 11 from opposite sides and meet. In the meeting faces, however, are grooves 862 which receive the nails, but are not deep enough to permit them to entirely slip through. The shape of the groove is shown in Fig. 16, being of approximately equal width throughout its length but of a much greater depth at its upper than at its lower end. The upper end of the groove is deep enough to receive the point of the nail in whatever position it may occupy when falling through the chute, but the lower end is shallower than the radius of the nail. Thus, if a nail should fall between the detents with the wider dimension of its flattened point lying approximately in the plane of the detents, or in any other plane than one transverse to the detents, it would engage the walls of the grooves and be turned thereby about its longitudinal axis until the flattened sides lie next the walls of the groove. Thereby each nail is turned before being driven into the work, so that its wider dimension at its point lies transversely to the plane of the detents. These detents being located as shown in the drawings, in a plane which coincides to the direction of feed of the work, cause the nails to occupy the desired position, so that when driven, their points will be clenched along the line of feed, that is, in the line located by the nails.

We claim:—

1. A nailing machine comprising a nail hopper, a stationary raceway therein projecting through the front wall thereof, a chute for conducting nails from the outer end of said raceway to the driver, a nail lifter reciprocating through the bottom of the hopper for arranging the nails in order and delivering them to the raceway, said lifter having a foot beneath the hopper, a driver, means for advancing the driver and lowering the lifter, and means for suddenly returning the lifter and causing the foot thereof to strike and jar the hopper.

2. A nailing machine comprising a column or frame, a work-support, a nail throat in line with the end of said support, a nail hopper, a raceway in the hopper, a conducting chute leading from the raceway end to the throat, a driver reciprocating in said throat, a nail lifter arranged to reciprocate close to the upper end of the raceway, an operating lever connected so as to reciprocate the driver and lifter, a guide arranged transversely of the raceway, a slide mounted to travel thereon, a feeder having an offset nail passage depending from said slide between the raceway and chute, a clearer projecting from the slide and carried by the movement thereof across the top of the raceway to dislodge incorrectly-positioned nails, and connections driven by the operating lever for actuating said slide.

3. A nailing machine comprising a column or frame, a work-support, a nail throat in line with the end of said support, a nail hopper, a raceway in the hopper, a conducting chute leading from the raceway end to the throat, a driver reciprocating in said throat, a nail lifter arranged to reciprocate close to the upper end of the raceway, an operating lever connected so as to reciprocate the driver and lifter, a guide arranged transversely of the raceway, a slide mounted to travel thereon, a feeder having an offset nail passage depending from said slide between the raceway and chute, a rock-shaft linked to said slide, and a sliding bar engaged with said rock-shaft and the operating lever for transmitting oscillatory movement to the former from the latter.

4. A nail-driving machine including in its construction a chamber with inclined walls, forming the sides of a hopper to contain nails, a front plate pivoted to one side of the hopper, and a horizontal plate secured to said front plate, arranged to project across the space between the hopper walls and support nails placed therein, and removable to permit discharge of the nails when the front plate is swung open.

5. A nail-driving machine including a hopper, an inclined raceway extending into the hopper, and a device crossing the raceway for feeding nails therefrom, said feeding device including a plate adapted to be swung aside to uncover the raceway passage and permit escape of all the nails confined therein, and a shoulder on the plate coöperating with a fixed stop for locating the plate correctly after it has been swung aside.

6. A nail-driving machine including a hopper, an inclined raceway extending into the hopper, and a device crossing the raceway for feeding nails therefrom, consisting of a plate having a beveled nail-picking blade and a pivoted plate normally arranged to close the raceway passage when the first plate is at one side thereof, said pivoted plate being adapted to swing aside and permit escape of the nails in the raceway passage.

7. A nail-driving machine including a hopper, an inclined raceway extending into the hopper, and a device crossing the raceway for feeding nails therefrom, consisting of a plate having a beveled nail-picking blade and a pivoted plate normally arranged to close the raceway passage when the first plate is at one side thereof, said pivoted plate being adapted to swing aside and permit escape of the nails in the raceway passage, said plates having coöperating abutments by which the pivoted one is correctly positioned when returned after having been deflected.

8. A nailing machine having provisions for quickly changing the nails to be driven, comprising a hopper having a removable bottom partition and a discharge passage below the said partition, a raceway, a driver, a guide to conduct nails from the raceway to the driver, and a nail feeder and arrester so mounted as to be capable of immediate displacement from the path of the nails to permit discharge thereof from the raceway, said nail guide being so associated with said bottom partition that when the latter is moved to uncover the discharge passage, the guide is out of receiving position relatively to the raceway.

9. A nailing machine comprising a nail hopper having a movable wall which can be displaced to empty the hopper, a throat having a passage for a driver and an inlet at one side for admitting nails to said passage, and a nail-supplying tube fastened to said hopper wall and movable therewith when the same is opened, said tube being of flexible material and having a metallic end piece capable of insertion into the nail inlet of the throat, whereby to permit ready connection and disconnection of the tube with, and from, the throat when said wall is closed and opened.

10. In a nailing machine, the combination with nail-feeding and nail-driving mechanism, of a throat for guiding nails to the work, having a driver passage and an opening in its side communicating with said passage, a convex plate extending across the lower part of said opening, and a chute for conducting the nails from the feeding devices to the throat, having a metallic lower end detachably inserted in such opening and retained therein by said plate.

11. In a nail-driving machine, in combination with the nail-feeding devices and the driving mechanism, a nail throat for guiding the nails and driver, said throat having a pocket in its side opening into the driver passage, said pocket being formed by a convex plate covering the lower part of a lateral aperture in the throat, and a chute for conducting nails from the feeding devices to the throat, arranged with its lower end inserted detachably in said pocket.

12. In a nail-driving machine, a throat for guiding nails to the work, a nail-arresting detent projecting into said throat and having a groove of diminishing depth from upper to lower end, whereby nails of non-circular cross-section coming into engagement with the bottom of said groove are turned about their longitudinal axes and caused to occupy a predetermined position with respect to the parts of the machine.

13. In a nail-driving machine, a throat for conducting nails to the work, yielding detents projecting from opposite sides into the throat and meeting in the nail passage, the meeting portions of said detents having grooves of diminishing depth from top to bottom and together forming a channel of which the lower end is non-circular and has its greatest width in a plane at right angles to that of the detents.

14. In a nail-driving machine, a work-support, a nail throat, yielding means causing said throat to bear against the work to guide the nails to the exact point at which they are to be driven, and a cam reacting between a portion of the throat and a fixed part of the machine for withdrawing the throat in opposition to said yielding means.

15. In a nail-driving machine, a work-support, a nail throat, yielding means causing said throat to bear against the work to guide the nails to the exact point at which they are to be driven, a cam pivoted to a fixed part of the machine, a projection on the throat bearing on said cam under the pressure of said yielding means, and a guide through which said projection is passed, preventing displacement thereof.

In testimony whereof we have affixed our signatures, in presence of two witnesses.

GEORGE B. EVANS.
THOMAS E. CHERRY.

Witnesses:
A. H. BROWN,
A. C. RATIGAN.